April 29, 1952     M. H. SWEET     2,594,514

COMPARISON TYPE DENSITOMETER

Original Filed April 16, 1946     3 Sheets-Sheet 1

INVENTOR
MONROE H. SWEET
BY
ATTORNEYS

April 29, 1952 M. H. SWEET 2,594,514
COMPARISON TYPE DENSITOMETER
Original Filed April 16, 1946 3 Sheets-Sheet 2

INVENTOR
MONROE H. SWEET
ATTORNEYS

April 29, 1952     M. H. SWEET     2,594,514
COMPARISON TYPE DENSITOMETER
Original Filed April 16, 1946     3 Sheets-Sheet 3

INVENTOR
MONROE H. SWEET
BY
ATTORNEYS

Patented Apr. 29, 1952

2,594,514

UNITED STATES PATENT OFFICE 2,594,514

COMPARISON TYPE DENSITOMETER

Monroe H. Sweet, Binghamton, N. Y., assignor to General Aniline & Film Corporation, New York, N. Y., a corporation of Delaware Original application April 16, 1946, Serial No. 662,529, now Patent No. 2,561,243, dated July 17, 1951. Divided and this application December 20, 1949, Serial No. 134,095

8 Claims. (Cl. 88—14)

This invention relates to null type electronic measuring circuits, and more particularly to comparison type densitometers in which the light incident upon light responsive means from primary and comparison lamp sources is balanced to ascertain the value of a characteristic of a sample to be measured. This application is a division of co-pending application Serial No. 662,529, filed April 16, 1946, now Patent No. 2,561,243, issued July 17, 1951, for "Comparison Type Densitometer and Electronic Measuring Circuit Therefor."

Various kinds of comparison type densitometers have previously been suggested. As is known to those skilled in the art, the density of a sample, such as a piece of photographic film, is a logarithmic function of its light transmission properties. Accordingly, in comparison type densitometers the illumination incident upon the photo-responsive means from the comparison lamp must be logarithmically compensated in order that the density be indicated upon a uniformly graduated scale. Hitherto, complicated and expensive means have been used for such logarithmic compensation. Such means have included devices such as variable area masks, optical wedges and so forth. Other expedients have relied upon the inverse square law, by moving the comparison light source toward and away from the photo-responsive means. All of these prior devices have been subject to disadvantages due to their instability with respect to time, temperature and humidity, their inconveniently large dimensions to obtain an adequate range of measurements, and their expense of construction in order to obtain any degree of accuracy and mechanical and optical quality.

It is among the objects of the present invention to provide a null type measuring system employing primary and comparison sources of radiant energy and electrical means for logarithmically compensating the intensity of the comparison source to obtain a balance of the energy incident from both sources upon an energy sensitive measuring element; to provide a null type or comparison densitometer in which the illumination intensity of a comparison lamp is logarithmically compensated by electrical means, including means effective to indicate, on a uniformly graduated scale, the density of a sample; to provide a null type or comparison densitometer including incandescent lamps as the primary and comparison light sources and resistance means for varying the illumination of the comparison lamp; to provide such a circuit including a single photoemissive vacuum tube, means to alternately direct onto said tube light from the comparison source and light from the primary source, and mechanism synchronized with such means for alternately connecting the output of the tube to a pair of input terminals of a measuring circuit; and to provide a simple, inexpensive highly accurate and compact null type or comparison densitometer.

These and other objects, advantages and novel features of the invention will be apparent from the following description and the accompanying drawings. In the drawings.

The present invention is based upon the principle that the candle power or light output of an incandescent lamp is substantially a logarithmic function of the external resistance through which filament current passes included in the lamp circuit. Therefore, if such an adjustable or variable resistance included in the lamp circuit is associated with indicating means having a substantially uniformly graduated scale calibrated in density, the resistance may be used to vary the illumination of the comparison lamp to obtain a balance between the light incident upon photo-responsive means directly from the comparison lamp and that incident upon the photo-responsive means from a primary lamp through an interposed sample. According to the present invention, the resistance may be manually adjusted to obtain such balance or the resistance may be automatically varied in accordance with variations in the amount of light incident upon the photo-responsive means from the primary lamp. In the latter instance, a current measuring meter having a virtually uniformly graduated scale may be connected in the comparison lamp input circuit to indicate directly the density of the sample.

Figure 1:
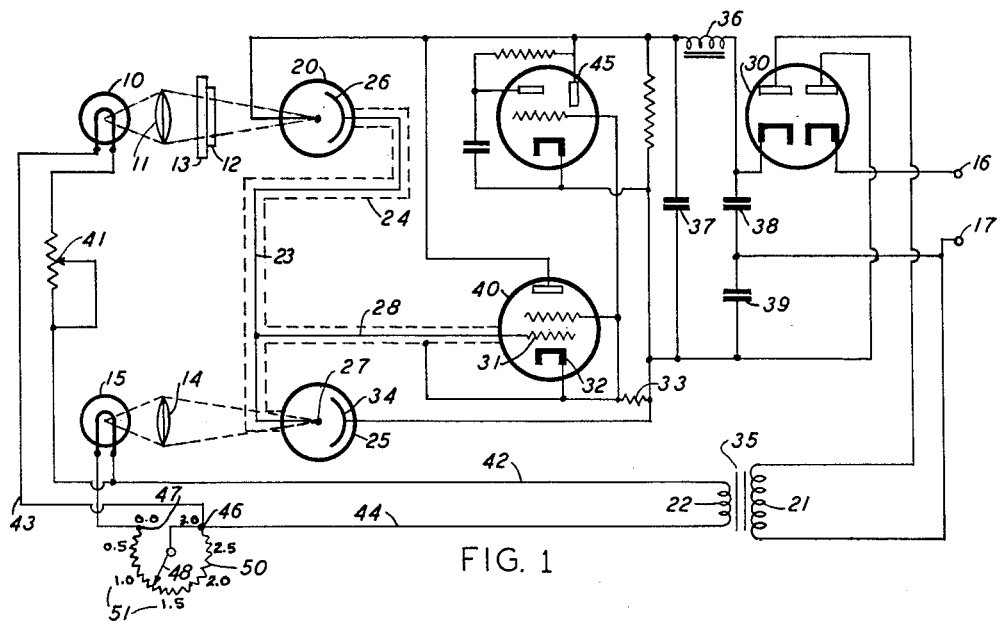
Figure 1 is a schematic wiring diagram of one embodiment of the invention.

Referring to Figure 1, which illustrates one embodiment which the invention may assume in practice, a primary light source 10 and a comparison light source 15 are arranged to direct light upon photoemissive vacuum tubes 20 and 25, respectively. Light sources 10 and 15 are desirably incandescent tungsten filament lamps. The light from primary lamp 10 is condensed by a lens 11 and directed through a sample 12 mounted on a support 13 upon the phototube 20. Light from comparison source 15 is condensed by a lens 14 and directed toward phototube 25. Null indicating means are associated with phototubes 20 and 25 to indicate a balance between the light beams incident thereupon from their respective associated lamps 10 and 15.

The operating potentials for the circuit elements are derived from a suitable source, such as alternating current, connected to terminals 16, 17. Such operating potentials are applied to a voltage doubler tube 30 of a conventional type and the output of tube 30 is applied to the primary winding 21 of a transformer 35. Secondary winding 22 of transformer 35 is connected to the input circuits of lamps 10 and 15 in a manner described more fully hereinafter.

A conductor 23, provided with shielding 24, connects cathode 26 of phototube 20 to anode 27 of phototube 25. A conductor 28 likewise shielded, connects conductor 23 to the control grid 31 of an amplifier tube 40. Cathode 32 of tube 40 is connected to shielding 24 and, through a resistor 33, to cathode 34 of phototube 25. A conventional null indicating electronic tube 45, which may be of the "cathode ray" type used as a tuning indicator in radio sets, is connected in the output circuit of amplifier tube 40 in the usual manner to indicate a balance between the currents or voltages of phototubes 20 and 25. As the operation of such "cathode ray" tubes and their circuit connections are well-known to those skilled in the art, detailed description is not believed necessary. The operating potentials applied to amplifier tube 40 and "cathode ray" tube 45 are derived from voltage doubler tube 30 through a suitable filter circuit including inductance 36 and condensers 37, 38 and 39.

The illumination of primary lamp 10 is controlled by a variable resistor 41 connected in series between one terminal of secondary winding 22 of transformer 35 and one terminal of incandescent lamp 10. The other terminal of lamp 10 is connected by conductors 43 and 44 to the other terminal of secondary winding 22. Potentiometer 41 is utilized to control the current and thereby adjust the illumination intensity of lamp 10 to the desired value.

The illumination intensity of comparison lamp 15 is similarly varied. One terminal of lamp 15 is connected through conductor 42 to the source of current comprising the winding 22. The other terminal thereof is connected to terminal 47 of adjustable resistance 50. The other terminal of resistor 50 and its adjustable contact 48 are connected to the winding 22 by means of conductor 44. The variable resistor 50 is provided with uniformly spaced indicia 51 cooperable with contact 48 for indicating the density of sample 12. These density value indicia may range from 0.0 at terminal 47 to 3.0 at terminal 46. This range is sufficiently broad practice to accommodate all ordinary density measurements.

The operation of the embodiment shown in Figure 1 is as follows: When the apparatus has been turned on and allowed to warm up, rider 48 is set at 0.0 density, bringing comparison lamp 15 to its maximum brightness value. Resistance 41 is then adjusted to vary the brightness of primary lamp 10 to balance the current from phototubes 20 and 25, as indicated by the electronic null indicator 45. Such balancing is done with sample 12 removed from the path of light from lamp 10 to phototube 20.

Sample 12 is then interposed between lamp 10 and phototube 20 and rider 48 is adjusted until the phototube currents are again balanced as indicated by tube 45. The density of sample 12 is then read by noting the position of arm 48 relative to indicia 51. In the initial adjustment, tube 45 is not necessarily "tuned" to a minimum shadow angle but need only be "tuned" to a point within its operating range at which tube 45 is sensitive to further changes in the current from either phototube. This particular shadow angle is then reproduced both for the zero setting and for the actual density reading.

Figure 3:
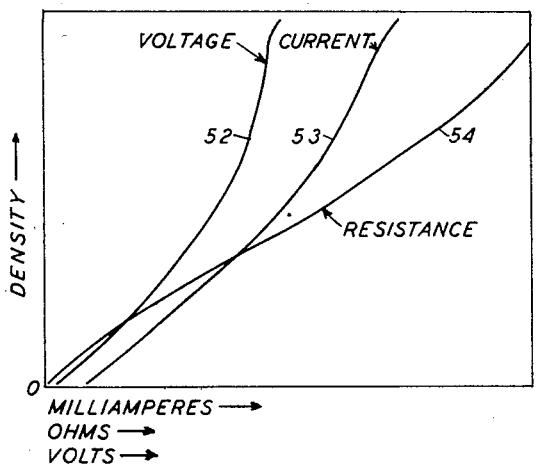
Figure 3 is a set of curves illustrating the relation between sample density and electrical characteristics of a comparison source of light.

The theory will be clear by reference to Figure 3, wherein curves 52, 53, 54 represent respectively the variation in the voltage, current and resistance of incandescent lamps 10 and 15 with respect to density of sample 12. It will be noted from curve 54 that the effective resistance of the incandescent lamp filament varies substantially directly as the density of sample 12. Thus, resistance 50, which controls the illumination of lamp 15 may be provided with a uniformly graduated scale, including the indicia 51, to indicate directly the density of sample 12. The circuit thus provides an effective null type comparison densitometer which is compact, relies upon simple means for effecting balance between primary and comparison lamps and has good accuracy. When an extremely sensitive receiving element-null detector system is used, such as a photomultiplier tube, or when further amplification is provided, the circuit may be used to read very high neutral or color film densities.

Figure 2:
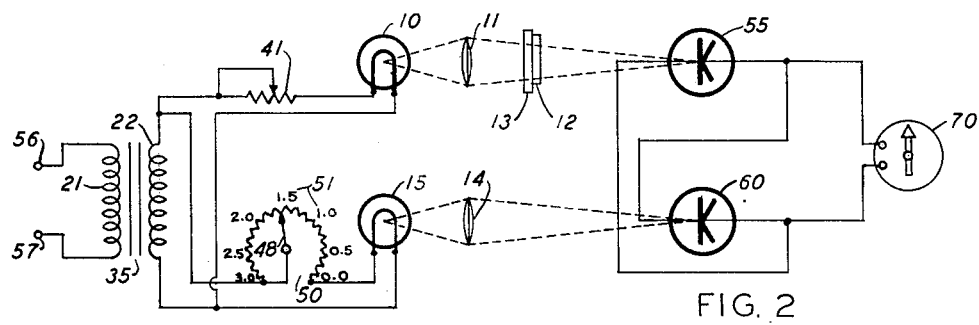
Figure 2 is a schematic wiring diagram of another embodiment of the invention.

The principles of the circuit of Figure 1 may be applied equally to a comparison type densitometer utilizing barrier layer photocells, as shown in Figure 2. In this figure, elements identical with those in Figure 1 have been given corresponding reference characters. A potential from a suitable source is applied to terminals 56 and 57 connected to primary winding 21 of transformer 35. Secondary winding 22 provides the operating potentials for primary lamp 10 and comparison lamp 15. The lamp controlling circuits are thus the same as those of Figure 1.

Light from primary lamp 15 is condensed by lens 11 and directed through sample 12 mounted on support 13 upon a barrier layer photocell 55. Similarly, light from a comparison lamp 15 is condensed by lens 14 and directed upon barrier layer photocell 60. The outputs of photocells 55 and 60 are impressed in opposition across an indicating meter 70, which may be either a voltmeter, an ammeter or a galvanometer, to indicate a balance of the outputs of photocells 55 and 60. The circuit of Figure 2 operates in the same manner as that of Figure 1. Resistor 50 is adjusted until meter 70 indicates a balance of the outputs of photocells 55 and 60. The density of sample 12 then may be read directly by noting the position of pointer 48 with respect to indicia 51. In the arrangement of Figure 2, no "warm-up" period is necessary.

Figure 4:
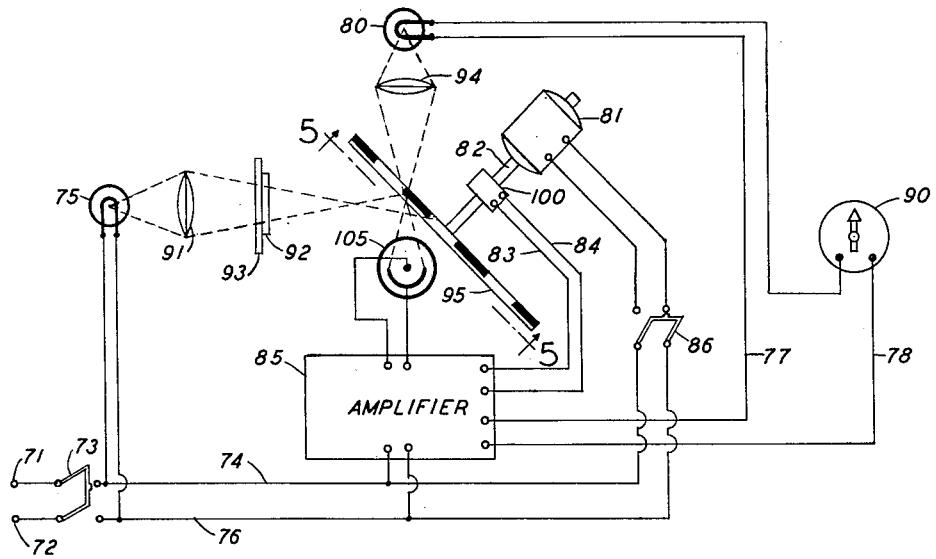
Figure 4 is a schematic diagram of a further embodiment of the invention.

Figure 4 illustrates a comparison type densitometer in which the illumination of the comparison lamp is automatically maintained at such a level that there is a substantial balance of the light incident upon the photo-responsive means from the comparison lamp and from the primary lamp. As schematically shown, the arrangement comprises a primary incandescent lamp 75 and a comparison incandescent lamp 80. A source of potential is applied to terminals 71, 72, connected, through a switch 73, to conductors 74, 76. Primary lamp 75 and amplifier 85 are supplied with energy from the same alternating current source, being connected directly across conductors 74, 76. Comparison lamp 80 is connected to the output of amplifier 85 through a pair of conductors 77, 78, and an ammeter 90 is connected in series circuit relation with lamp 80 to indicate the intensity of illumination in terms of filament.

Figure 5:
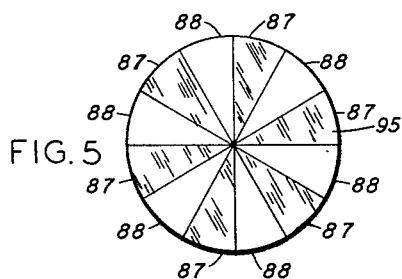
Figure 5 is a view on the line 5—5 of Figure 4.

The arrangement of Figure 4 includes a chopper mirror 95 rotated by a motor 81. A single pole, double-throw switch 100 is operated in synchronism with mirror 95 by motor 81, as through the medium of drive shaft 82. Switch 100 is connected to amplifier 85 by conductors 83, 84, and motor 81 is connected to conductors 74, 76 through a switch 86. Referring to Figure 5, which is a face view of mirror 95, the mirror comprises a glass disk having alternate sectors 87 silvered on their back surfaces to provide reflecting surfaces, and intermediate sectors 88 left clear to pass light therethrough.

Mirror 95 is arranged at an angle with respect to lamps 75 and 80 and a phototube 105 having its output circuit connected to amplifier 85. Light from primary lamp 75 is condensed by a lens 91 and directed, through a sample 92 mounted on a support 93, onto mirror 95. Comparison lamp 80 is aligned directly with phototube 105 and its light is condensed by a lens 94 and directed upon the phototube through mirror 95. As the mirror is revolved, light from lamp 75 and light from lamp 80 will be alternately reflected or transmitted onto phototube 105. The light from lamp 75 is reflected by mirrored sections 87 on to the phototube whereas the light from comparison lamp 80 passes directly through clear sections 88 on to the phototube. As will be described in connection with Figure 6, switch 100 alternately connects different input terminals of amplifier 85 to the output circuit of phototube 105. The circuit connections are such that the output current of amplifier 85 is varied, varying the illumination of comparison lamp 80 and this output current is indicated by meter 90. The amplifier in effect provides a resistance in series circuit relation with comparison lamp 80 and thus varies the filament current directly and due to the inherent characteristic of the lamp also the intensity logarithmically with respect to variations in the output impedance of amplifier 85, so that meter 90 is effective to indicate the filament current in terms of density of sample 92 upon a uniformly graduated scale.

Figure 6:
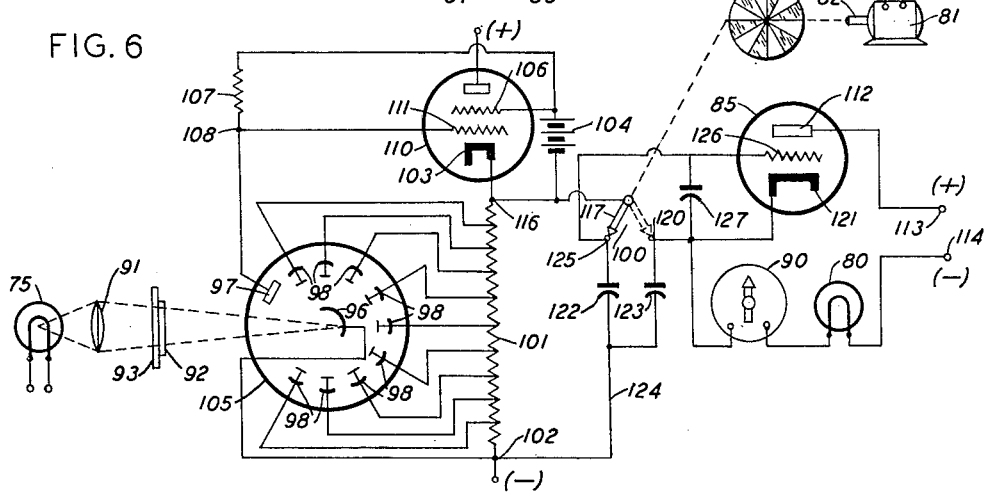
Figure 6 is a schematic wiring diagram of the embodiment of the invention shown in Figure 4.

Figure 6 is a schematic wiring diagram illustrating the operation of the arrangement shown in Figure 4. As shown, phototube 105 may comprise a photomultiplier tube having a cathode 96, an anode 97 and multiplier elements or dynodes 98. The operating potentials for multiplier tube 105 are derived from a potentiometer or other voltage arrangement 101 having one terminal 102 connected to the negative terminal of a suitable source of substantially constant direct current potential. The other terminal 116 of potentiometer 101 is connected, in series with an electronic tube 110, to the other terminal of the source of direct current potential. Terminal 102 is connected to cathode 96, and equi-spaced points on the points on the potentiometer are connected to dynodes 98. The dynode 98 next to anode 97 is connected also to the cathode 103 of tube 110. A voltage stabilizer means may be connected between anode 97 and dynode 98 in the manner described and illustrated in my co-pending application Serial No. 647,932, if deemed necessary.

Cathode 103 is connected to a terminal of a grid biasing source of potential, such as a battery 104, and the opposite terminal of battery 104 is connected to screen grid 106 and, through a grid biasing resistor 107, to a junction point 108. Junction point 108 is connected to anode 97 and to control grid 111 of tube 110.

The operation of the circuit thus far described is the same as described in my co-pending applications Serial Nos. 570,627, now Patent No. 2,478,163, issued August 2, 1949, and 647,932, now Patent No. 2,457,747, issued December 28, 1948. Linear attenuation of the operating potentials applied to multiplier tube 105 is effected by the operation of tube 110 in such a manner that the output current of tube 105 varies inversely as a logarithmic function of the anode current of multiplier tube 105. The anode current of tube 105 varies directly as the amount of illumination incident upon its cathode 96. Consequently, the output current of tube 110 is an inverse logarithmic function of the amount of light incident upon cathode 96 of tube 105. This incident light is a direct function of the transmission of sample 92 and a logarithmic function of the density of the sample. Accordingly, the output current of tube 110 is a direct measure of the density of sample 92.

As anode 97 current increases, with increased incident illumination, the potential drop across biasing resistor 107 increases and thus control grid 111 becomes more negative. This decreases the output current of tube 110 and accordingly decreases the operating potentials applied by bleeder resistor or potentiometer 101 to the elements of multiplier tube 105. A corresponding action, in reverse direction, occurs when the illumination on tube 105 decreases.

The output potential drop across potentiometer 101 is applied to the input circuit of amplifier 85. For this purpose, anode 112 of amplifier 85 is connected to the positive terminal 113 of a suitable source of substantially constant potential. Negative terminal 114 of the course is connected, in series circuit relation with comparison lamp 80 and indicating meter 90 to cathode 121 of amplifier 85.

The positive terminal 116 of resistor 101 is connected to the movable contact 117 of switch 100. As diagrammatically illustrated, contact 117 is connected to operate in synchronism with chopper mirror 95 which is rotated by shaft 82 of motor 81. The arrangement is such that, when light from primary lamp 75 is directed on tube 105 by mirror 95, contact 117 engages a fixed contact 120. When light from comparison lamp 80 is received by tube 105 through clear sector 88, contact 117 engages fixed contact 125. Contact 120 is connected to the cathode 121 of amplifier 85 and contact 125 is connected to the control grid 126 of amplifier 85. Variable condensers 122, 123 connect contacts 120, 125, respectively, to conductor 124 connected to negative terminal 102 of potentiometer or bleeder resistor 101. A third variable condenser 127 is connected across the input circuit of amplifier 85 and serves to stabilize the grid-cathode voltage during the operation of the circuit.

The response of phototube 105 to the differing lights directed thereupon from lamps 75 and 80, is sufficiently rapid that the voltage drop across bleeder resistor 101 accurately reflects the logarithmic intensity of each of the lamps during the time that light from either of the lamps is received by phototube 105. This potential drop is applied alternately to cathode 121 and grid 126 of amplifier 85. If the comparison and primary beams are of the same intensity, the voltage drops across condensers 122 and 123 will be identical and therefore terminals 125 and 120 will be at the same potential.

Assume that the light from primary lamp 75 is momentarily interrupted by the insertion of sample 92. The polarity relations are such that condenser 122 will be charged to a lower voltage than condenser 123. Consequently, grid 126 will become more negative with respect to cathode 121. This, in turn, reduces the output current of amplifier 85 and thereby reduces the intensity of comparison lamp 80. Electrical equilibrium will follow optical equilibrium, and the circuit will stabilize at the point where light falling on phototube 105 from each of the lamps 75 and 80 is substantially equal. The variation in the illumination of lamp 80 is measured, in terms of its current, by meter 90 which thus gives a direct indication, on a substantially uniformly graduated scale, of the density of sample 92.

The use of the logarithmically responsive circuit associated with phototube 105 provides a wide density range over which the sensitivity of the circuit is approximately constant. If a linearly responsive circuit were used, the indicating system would be 1000 times as sensitive at densities of sample 92 in the vicinity of 0 as at densities in the neighborhood of 3.0 resulting in serious circuit complications.

The described arrangement provides an optical electronic system wherein the density of a sample is measured by means of an optical feedback circuit in which the primary and comparison lamp beams are alternately directed at a single phototube and the electronic circuit is so arranged that the intensity of the comparison beam is automatically stabilized at such a level as to produce virtually no flicker in the light incident upon the phototube. By varying the resistance included in the circuit of the comparison lamp, a direct reading of density is obtainable due to the logarithmic relation between sample density and comparison lamp resistance.

Figure 7:
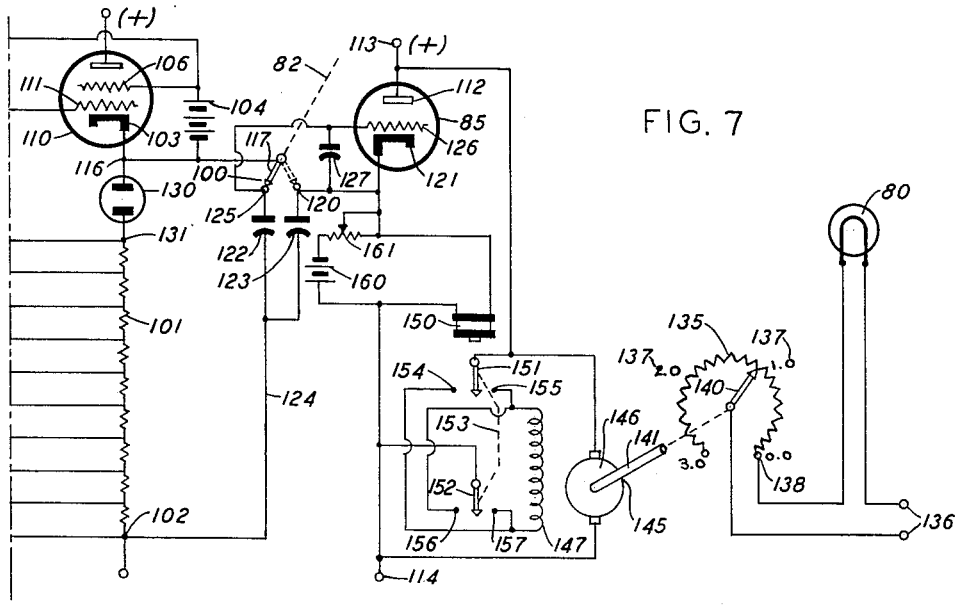
Figure 7 is a schematic wiring diagram corresponding to a portion of Figure 6 and illustrating a modified form of the invention.

Figure 7 illustrates a modified form of a photomultiplier tube embodiment of the invention shown in Figure 6. In Figure 7, a motor operated rheostat is used to vary the brightness of the comparison lamp automatically to achieve a balance of the light alternately incident upon the photomultiplier tube 105 of Figure 6, from the primary and comparison lamps. The portion of Figure 7 to the left of the dot and dash line is the same as the corresponding portion of Figure 6, and similar reference numerals have been used to designate identical elements. The embodiment of Figure 7 is used with the chopper mirror arrangement of Figures 4 and 5, as indicated by the broken line 82 representing the mirror axis connected to switch 100.

In this embodiment of the invention, a voltage stabilizer means, such as a voltage stabilizer tube 130, is connected between terminal 131 of resistor series 101 and cathode 103 of tube 110, in the same manner as described and illustrated in my said copending application Serial No. 647,932, now Patent No. 2,457,747, issued December 28, 1948. As explained in said copending application, stabilizer tube 130 maintains a substantially constant, relatively high voltage between anode 27 and the last dynode 98 of phototube 105 to stabilize operation of the circuit. The remainder of the circuit, as far as amplifier 85 operates in the same manner as does the circuit of Figure 6.

However, in the embodiment of Figure 7, amplifier 85 does not directly control the flow of current through comparison lamp 80. Instead, a polarized relay 150 is connected in the output circuit of tube 85 in parallel circuit relation with a substantially constant biasing potential to effect operation of a motor driven rheostat 135 controlling the illumination of lamp 80 from a source of potential connected to terminals 136. Rheostat 135 is provided with density indicia 137 in the same manner as in rheostat 50 of Figures 1 and 2. Lamp 80 is connected in series between one terminal 136 and one terminal 138 of rheostat 135, and the movable contact 140 of the rheostat is connected to the other terminal 136.

Movable contact 140 is operated in a suitable manner by connection, either directly or through suitable reduction gearing, to the armature shaft 141 of a motor 145 indicated as a shunt motor having an armature 146 and a shunt field winding 147. When the densitometer is energized, a potential is applied constantly to armature 146. However, the polarity and energization of field 147 is controlled by polarized relay 150 having a pair of pivotally mounted armatures 151, 152 mechanically interconnected as indicated by the broken line 153. Armature 151 is connected to relatively positive terminal 113 and armature 152 is connected to relatively negative terminal 114. Armature 151 may engage either one of a pair of contacts 154, 155, and armature 152 may engage either one of a pair of contacts 156, 157. Contacts 154 and 157 are interconnected to each other and to one end of shunt field winding 147. Contacts 155 and 156 are interconnected to each other and to the other terminal of the shunt field winding. Therefore, the relative polarity of field winding 147 will depend upon which direction armatures 151 and 152 are swung by energization of relay 150.

Relay 150 is connected in the output circuit of amplifier tube 85 in parallel circuit relation with a source of biasing potential comprising, for example, a battery 160 in series circuit relation with a potentiometer 161.

The operation of the described circuit is as follows. With specimen 92 removed from the path of light extending from primary lamp 75 to mirror 95 (Figure 4), potentiometer 161 is adjusted to such a value that relay 150 will energize motor 145 to rotate rheostat contact 140 to the 0.0 density position, and so that relay 150 will then move its armatures 151, 152 to the neutral position. This assures a maximum brightness of comparison lamp 80.

Sample 92 is then placed between lamp 75 and mirror 95. The resulting unbalance in the amount of light reaching phototube 105 from lamps 75 and 80 will effect a change in the output current of amplifier tube 85. This effect takes place through the interaction of condensers 122, 123 as controlled by switch 100 operating in synchronism with mirror 95, all as described in connection with the operation in the embodiment of the invention shown in Figure 6. The balance between output current of tube 85 and the output current of battery 160 is thus upset, and this unbalance thereof will effect operation of relay 150 to swing its armatures in a direction to energize motor 145 to rotate arm 140 to adjust the brightness of comparison lamp 80 until rebalance of the light incident upon phototube 105 is effected. When such balance has been attained, relay 150 again assumes the neutral position shown in Figure 7 and motor 145 comes to a stop. The density reading of sample 92 may then be taken by noting the position of arm 140 with respect to indicia 137.

Figure 8:
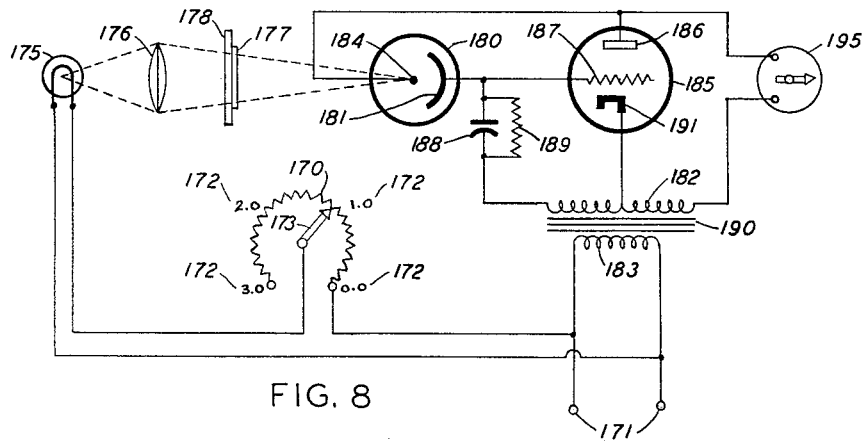
Figure 8 is a schematic wiring diagram of a further embodiment of the invention.

Figure 8 illustrates an embodiment of the invention in which only a single source of light is used to attain a density reading by the comparison method. In the embodiment shown in Figure 8, a rheostat 170 is connected, in series with an incandescent lamp 175, to a source of potential connected to terminals 171. Density indicia 172 are arranged around rheostat 170, in the same manner as previously described, for cooperation with the movable contact 173 of the rheostat. Light from lamp 175 is condensed by a lens 176 and directed through a sample 177 mounted on a support 178 onto the cathode 181 of the photoemissive vacuum tube 180.

Tube 180 is connected in a conventional manner to an amplifier tube 185 having its cathode 191 connected to the midpoint of the secondary winding 182 of a transformer 190. The primary winding 183 of the transformer is connected to terminals 171. Anode 184 of phototube 180 is connected to anode 186 of amplifier tube 185. Cathode 181 of the phototube is connected to the control grid 187 of amplifier 185. The control grid is also connected, through a parallel connected condenser 188 and resistor 189, to one terminal of secondary winding 182. The other terminal of winding 182 is connected, in series with an indicating meter 195 to anode 186.

The arrangement operates in the following manner. Arm 173 of rheostat 170 is adjusted to the 0.0 density position, with sample 177 removed, thus attaining the maximum brightness of lamp 175. Under these conditions, the indication of meter 190 is noted. Sample 177 is then interposed in the path of light from lamp 175 to phototube 180. Arm 173 is then adjusted until such time as meter 190 has the same reading as it had with sample 177 removed and arm 173 at the 0.0 density position. The density of sample 177 is then read by noting the relation of arm 173 to indicia 172.

Figure 9:
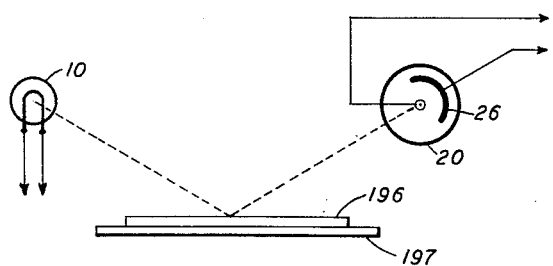
Figure 9 is a schematic view, diagrammatically illustrating the application of the invention to the measurement of reflection densities.

Figure 9 schematically illustrates how the principles of the invention may be applied to the measurement of reflection densities. For this purpose, the elements of Figure 1 are illustrated as arranged to read such reflection densities. Thus, light from primary lamp 10 which may be either lamp 10 of Figures 1 and 2, lamp 75 of Figures 4 through 7 or lamp 175 of Figure 8, is directed upon a sample 196 mounted on a suitable support 197, which sample reflects the light onto phototube 20 having its anode and cathode connected in the same manner as in Figure 1. The operation of the invention in its several embodiments is the same for measurements of reflection densities as for measurement of transmission densities.

By the above described embodiment of the invention, simple and effective comparison type measuring circuits, such as null-type densitometers, are provided in which the external resistance included in the energizing circuit of an incandescent lamp may be varied either manually or automatically to give a direct reading of density values on a uniformly graduated scale.

While specific embodiments of the invention have been shown and described in detail to illustrate the application of the principles thereof, it will be understood that the invention may be otherwise embodied without departing from such principles.

I claim:

1. A comparison densitometer comprising, in combination, a primary incandescent lamp; a comparison incandescent lamp; said lamps having such characteristics that their light intensity is logarithmically related to the electrical energy supplied; a light responsive means; mechanism effective alternately to direct upon said means light from said primary lamp through a sample whose density is to be measured and light directly from said comparison lamp; variable impedance means in series circuit relation with a source of potential and said comparison lamp; indicating means, having a substantially uniform density scale, operatively connected to said impedance means; means, having a pair of input terminals, operative to vary the impedance of said impedance means as a function of the relative potentials of said input terminals; and switching means operable in synchronism with said mechanism to connect said input terminals alternately to the output of said light responsive means to control said variable impedance means to vary the potential applied to said comparison lamp to balance the light incident upon said light responsive means from both of said lamps.

2. A comparison densitometer comprising, in combination, a primary incandescent lamp; a comparison incandescent lamp; said lamps having such characteristics that their light intensity is logarithmically related to the electrical energy supplied; a photomultiplier tube; bleeder resistor means connected to the elements of said tube and effective to apply operating potentials thereto; an amplifier tube having its output connected in series circuit relation with said means and a source of substantially constant potential; means connecting the input of said amplifier tube to the output of said multiplier tube, including circuit connections effective to vary the grid bias of said amplifier tube as an inverse function of the multiplier tube output current, whereby such operating potentials are varied inversely as the multiplier tube output current; rotating mirror means in operative association with said lamps and said multiplier tube, and effective alternately to reflect light received from said primary lamp, through a sample whose density is to be measured, onto said multiplier tube and to transmit light directly from said comparison lamp onto said multiplier tube; variable impedance means in series circuit relation with a source of potential and said comparison lamp; indicating means, having a substantially uniform density scale, operatively connected to said impedance means; means, having a pair of input terminals, operative to vary the impedance of said impedance means as a function of the relative potentials of said input terminals; and switching means operable in synchronism with said mirror means to connect said input terminals alternately to the output of said amplifier tube to control said variable impedance to vary the potential applied to said comparison lamp to balance the light incident upon said photomultiplier tube from both of said lamps.

3. A comparison densitometer comprising, in combination, a primary incandescent lamp; a comparison incandescent lamp; said lamps having such characteristics that their light intensity is logarithmically related to the electrical energy supplied; a light responsive means; mechanism effective alternately to direct upon said means light from said primary lamp through a sample whose density is to be measured and light directly from said comparison lamp; an indicating meter having a substantially uniformly graduated density scale; variable impedance means in series circuit relation with a source of potential; said meter and said comparison lamp, and having a pair of input terminals; the impedance of said impedance means varying as a function of the relative potentials of said input terminals; and switching means operable in synchronism with said mechanism to connect said input terminals alternately to the output of said light responsive means to control said variable impedance means to vary the potential applied to said comparison lamp to balance the light incident upon said light responsive means from both of said lamps.

4. A comparison densitometer comprising, in combination, a primary incandescent lamp, a comparison incandescent lamp; said lamps having such characteristics that their light intensity is logarithmically related to the electrical energy supplied; a photomultiplier tube; voltage means connected to the elements of said tube and effective to apply operating potentials thereto; a variable impedance means having an input connected to the output of said tube and an output in series circuit relation with said voltage means and a source of substantially constant potential, said variable impedance means controlling the potential of said voltage means as a function of the tube output current to correspondingly vary such operating potentials; mechanism effective alternately to direct upon said tube light from said primary lamp through a sample whose density is to be measured and light directly from said comparison lamp; an indicating meter having a substantially uniformly graduated density scale; an electronic tube having its output connected in series circuit relation with a source of potential, said meter and said comparison lamp, and having a pair of input terminals; the output impedance of said electronic tube varying as a function of the relative potentials of said input terminals; and switching means operable in synchronism with said mechanism to connect said input terminals alternately to the output of said variable impedance means to control said electronic tube output impedance to vary the potential applied to said comparison lamp to balance the light incident upon said photomultiplier tube from both of said lamps.

5. A comparison densitometer comprising, in combination, a primary incandescent lamp; a comparison incandescent lamp; said lamps having such characteristics that their light intensity is logarithmically related to the electrical energy supplied; a photomultiplier tube; bleeder resistor means connected to the elements of said tube and effective to apply operating potentials thereto; an amplifier tube having its output connected in series circuit relation with said means and a source of substantially constant potential; means connecting the input of said amplifier tube to the output of said multiplier tube, including circuit connections effective to vary the grid bias of said amplifier tube as an inverse function of the multiplier tube output current, whereby such operating potentials are varied inversely as the multiplier tube output current; rotating mirror means in operative association with said lamps and said multiplier tube, and effective alternately to reflect light received from said primary lamp, through a sample whose density is to be measured, onto said multiplier tube and to transmit light directly from said comparison lamp onto said multiplier tube; an indicating meter having a substantially uniformly graduated density scale; an electronic tube having its output connected in series circuit relation with a source of potential; said meter and said comparison lamp and having a pair of input terminals; the output impedance of said electronic tube varying as a function of the relative potentials of said input terminals; and switching means operable in synchronism with said mirror means to connect said input terminals alternately to the output of said multiplier tube to control said electronic tube output impedance to vary the potential applied to said comparison lamp to balance the light incident upon said photomultiplier tube from both of said lamps.

6. A comparison densitometer comprising, in combination, a primary incandescent lamp; a comparison incandescent lamp; said lamps having such characteristics that their light intensity is logarithmically related to the electrical energy supplied; a photomultiplier tube; bleeder resistor means connected to the elements of said tube and effective to apply operating potentials thereto; an amplifier tube having its output connected in series circuit relation with said means and a source of substantially constant potential; means connecting the input of said amplifier tube to the output of said multiplier tube, including circuit connections effective to vary the grid bias of said amplifier tube as an inverse function of the multiplier tube output current, whereby such operating potentials are varied inversely as the multiplier tube output current; rotating mirror means in operative association with said lamps and said multiplier tube, and effective alternately to reflect light received from said primary lamp, through a sample whose density is to be measured, onto said multiplier tube and to transmit light directly from said comparison lamp onto said multiplier tube; an indicating meter having a substantially uniformly graduated density scale; an electronic tube having its output connected in series circuit relation with a source of potential, said meter and said comparison lamp; a capacitance connected across the input of said electronic tube; a condenser having one terminal connected to the cathode of said electronic tube; means connecting the other condenser terminals to one terminal of said bleeder resistor means; and switching means operable in synchronism with said mirror means to connect said one condenser terminal alternately to the other terminal of said bleeder resistor means to vary the grid bias of said electronic tube means inversely as a function of the sample density to correspondingly vary the operating potential of said comparison lamp to balance the light incident upon said multiplier tube from both of said lamps.

7. A comparison densitometer comprising, in combination, a primary incandescent lamp; a comparison incandescent lamp; said lamps having such characteristics that their light intensity is logarithmically related to the electrical energy supplied; a photomultiplier tube; voltage means connected to the elements of said tube and effective to apply operating potentials thereto; variable impedance means having an input connected to the output of said tube and an output in series circuit relation with said voltage means and a source of substantially constant potential; said variable impedance means controlling the potential of said voltage means as a function of the tube output current to correspondingly vary such operating potentials; mechanism effective alternately to direct upon said tube light from said primary lamp through a sample whose density is to be measured and light directly from said comparison lamp; a variable resistor, including a contact arm movable relative to a substantially uniformly graduated density scale, in series circuit relation with said comparison lamp and a source of electric potential; said contact arm being adjustable to vary the illumination of said comparison lamp; a reversible electric motor operative to adjust said contact arm; a polarized relay directionally controlling the energization of said motor; an electronic tube having a pair of input terminals and having its output circuit connected in series with a source of potential and said relay; a source of biasing potential connected in parallel circuit relation with said relay; the output impedance of said electronic tube varying as a function of the relative potentials of said input terminals; and switching means operable in synchronism with said mechanism to connect said input terminals alternately to the output of said variable impedance means to control said electronic tube output impedance to control the polarity of said relay to in turn control the directional energization of said motor to adjust said contact arm to vary the illumination of said comparison lamp to balance the light incident upon said photomultiplier tube from both of said lamps.

8. A comparison densitometer comprising, in combination, a primary incandescent lamp; a comparison incandescent lamp; said lamps having such characteristics that their light intensity is logarithmically related to the electrical energy supplied; a photomultiplier tube; bleeder resistor means connected to the elements of said tube and effective to apply operating potentials thereto; an amplifier tube having its output connected in series circuit relation with said means and a source of substantially constant potential; means connecting the input of said amplifier tube to the output of said multiplier tube, including circuit connections effective to vary the grid bias of said amplifier tube as an inverse function of the multiplier tube output current, whereby such operating potentials are varied inversely as the multiplier tube output current; rotating mirror means in operative association with said lamps and said multiplier tube, and effective alternately to reflect light received from said primary lamp, through a sample whose density is to be measured, onto said multiplier tube and to transmit light directly from said comparison lamp onto said multiplier tube; a variable resistor, including a contact arm movable relative to a substantially uniformly graduated density scale, in series circuit relation with said comparison lamp and a source of electric potential; said contact arm being adjustable to vary the illumination of said comparison lamp; a reversible electric motor operative to adjust said contact arm; a polarized relay directionally controlling the energization of said motor, an electronic tube having a pair of input terminals and having its output circuit connected in series with a source of potential and said relay; a source of biasing potential connected in parallel circuit relation with said relay; the output impedance of said electronic tube varying as a function of the relative potentials of said input terminals; a capacitance connected across the input of said electronic tube; a condenser having one terminal connected to the grid of said electronic tube; a condenser having one terminal connected to the cathode of said electronic tube; means connecting the other condenser terminals to one terminal of said bleeder resistor means; and switching means operable in synchronism with said mirror means to connect said one condenser terminal alternately to the other terminal of said bleeder resistor means to vary the grid bias of said electronic tube inversely as a function of the sample density to control the polarity of said relay to in turn control the directional energization of said motor to adjust said contact arm to correspondingly vary the illumination of said comparison lamp to balance the light incident upon said photomultiplier tube from both of said lamps.

MONROE H. SWEET.

REFERENCES CITED

The following references are of record in the file of this patent:

UNITED STATES PATENTS

| Number | Name | Date |
|---|---|---|
| 1,919,182 | Fitzgerald | July 18, 1933 |
| 2,245,034 | Harrison | July 10, 1941 |